Aug. 19, 1969     F. S. BRILES     3,461,771
BLIND FASTENER Filed Aug. 7, 1967                                                 4 Sheets-Sheet 1

INVENTOR.
FRANKLIN S. BRILES
By Huebner & Worrel
ATTORNEYS.

Aug. 19, 1969  F. S. BRILES  3,461,771
BLIND FASTENER
Filed Aug. 7, 1967  4 Sheets-Sheet 2

INVENTOR.
FRANKLIN S. BRILES
By Huebner & Worrel
ATTORNEYS.

Aug. 19, 1969    F. S. BRILES    3,461,771
BLIND FASTENER

Filed Aug. 7, 1967    4 Sheets-Sheet 3

INVENTOR.
FRANKLIN S. BRILES
By Huebner & Worrel
ATTORNEYS.

Aug. 19, 1969  F. S. BRILES  3,461,771
BLIND FASTENER

Filed Aug. 7, 1967   4 Sheets-Sheet 4

INVENTOR.
FRANKLIN S. BRILES
By Huebner & Worrel
ATTORNEYS.

United States Patent Office 3,461,771
Patented Aug. 19, 1969

3,461,771
BLIND FASTENER
Franklin S. Briles, 6 Middleridge Lane,
Rolling Hills, Calif. 90274
Filed Aug. 7, 1967, Ser. No. 658,711
Int. Cl. F16b *13/10*
U.S. Cl. 85—70                           21 Claims

ABSTRACT OF THE DISCLOSURE

A blind fastener providing controlled interference preload in the structure immediately surrounding the fastener. The fastener has two primary parts: a sleeve having a tapered inner surface insertable in a mating bore in the structure providing axial clamp-up by means of a head on its outer end and a nut section formed on its inner end by a preentry pull-up tool insertable through the sleeve, and a tapered, oversize pin telescopically drivable into interlocked engagement within the sleeve to preload the sleeve against the surrounding structure and solidly fill the bore for high shear strength.

BACKGROUND OF THE INVENTION

The present invention relates to blind fasteners, i.e., bolt type fasteners capable of being installed from only one side of a structure, and it relates more particularly to blind fasteners adapted for use in highly stressed structures, such as modern aircraft structures.

Although large numbers of blind fasteners are required in modern high-speed aircraft, prior to the present invention blind fasteners have, in general to keep pace with the ever-increasing requirements for strength and fatigue resistance, and have fallen far behind conventional bolt-type fasteners that are installed from both sides of a structure.

One of the principal failings of conventional blind fasteners is that they tend not to be fully hole-filling, and more particularly, they are not capable of establishing radial interference prestress in the region of the structure immediately surrounding the fastener, whereby joints that are secured by conventional blind fasteners tend to have relatively poor fatigue characteristics. It is now widely recognized throughout the aircraft industry that structural connections can be given greatly increased fatigue resistance and strength by providing a controlled amount of interference between the fastener shank and the structure in the vicinity of the bore to prestress the structure. The principal teaching in this regard is in U.S. Letters Patent No. 3,034,611, issued May 15, 1962, to John Zenzic, which teaches the use of a tapered fastener engaged in a complementary tapered bore with a controlled amount of interference between the fastener and the wall of the bore to accomplish the prestressing. Tapered fasteners according to the Zenzic Patent No. 3,034,611 are now used extensively in the aircraft industry to provide increased fatigue resistance and useful life to structural connections without any appreciable added weight. Nevertheless, heretofore there has been no satisfactory means for employing the teaching of the Zenzic Patent No. 3,034,611 in a blind fastener, and accordingly blind fasteners have been substantially inferior in strength and fatigue resistance.

Another problem with conventional blind fasteners is that they embody three or more principal parts, as compared with the usual two parts for a bolt, making them in general undesirably complex and heavy, and reducing their reliability. Thus, the typical prior art blind fastener includes a threaded bolt and sleeve combination, together with a separate expansion sleeve. Such conventional blind fastener combinations require a head on both the sleeve and the threaded bolt, with the bolt head being seated in the sleeve head, which results in a head size that is substantially larger than that of a normal bolt. This can be a serious disadvantage in some situations, as for example where relatively thin aircraft skins are joined together, requiring the fastener heads to be flush with the outer skin, in which case the outer skin is weakened by undesirable large counterskins to accommodate the blind fastener heads.

Another problem in connection with conventional blind fasteners is that it has heretofore been difficult in such fasteners to obtain both high shear strength and good axial clamp-up tensioning which would be comparable to conventional bolt-type fasteners installed from both sides of the structure.

A still further problem is connection with conventional blind fasteners is that they embody wrenching depressions or other irregularities which are undesirable where the fastener is utilized for an aircraft skin.

SUMMARY OF THE INVENTION

In view of these and other problems in the art, it is an object of the present invention to provide a novel blind fastener which is particularly simple in construction, embodying only two primary parts, is relatively light in weight, and provides good strength and fatigue characteristics to a structural joint secured thereby, comparable to those achieved with conventional bolt-type fasteners.

Another object of the present invention is to provide a blind fastener which is not only fully hole-filling, but in addition establishes controlled radial interference preload in the structure immediately surrounding the fastener so as to greatly increase the fatigue life of the structure. In this regard, it is a more detailed object of the invention to provide a blind fastener embodying a sleeve as the primary means to obtain axial clamp-up, and a pin insertable into the sleeve as the primary means to obtain high shear strengths in the fastener, the shank of the pin and the inner surface of the sleeve being tapered, with the pin oversized, so as to provide a tapered interference fit generally in accordance with the teaching of the Zenzic Patent No. 3,034,611, but wherein the interference is initiated between parts of the fastener itself rather than merely between the exterior of the fastener and the wall of the bore in the structure as disclosed in the Zenzic Patent No. 3,034,611.

Another object of the invention is to provide a blind fastener of the character described wherein the radial interference fit is arranged to also provide substantially improved axial clamp-up forces in a blind fastener.

Another object of the invention is to provide a blind fastener of the character described wherein the usual necessity of a pair of nested heads on a sleeve and core bolt is eliminated, whereby a relatively small head size may be employed in a blind fastener, and in particular a head size comparable to that of a conventional non-blind fastener, thereby minimizing the size of the countersink required where the head of the fastener is flush with the surface of the part so as to preserve maximum strength in the part.

A further object of the invention is to provide a blind fastener which has unusually high shear strength, which is of particular importance in highly stressed aircraft structures wherein the fasteners are employed mainly for shear strength.

A still further object is to provide a blind fastener of the character described which has no threads in bearing when assembled and in operation.

Additional objects are to provide a blind fastener having a flat head surface without the usual interruptions therein for wrenching, so as to permit positive flush positioning of the fastener head with an external surface of a structure such as an aircraft skin; and which does not require use of a break-off part which would leave an exposed, unplated bolt end.

Other objects and advantages of the present invention will appear during the course of the following part of the specification, wherein the details of construction and mode of operation of presently preferred embodiments are described with reference to the accompanying drawings, wherein:

DETAILED DESCRIPTION

FIGURES 1 to 5 illustrate a first form of blind fastener according to the present invention, and show the fastening together of a pair of plates or sheets 10 and 12 by means of this first form of the invention. The plates 10 and 12 are in stacked or overlapping relationship, the plate 10 having an exposed upper surface 14 which will be assumed to be accessible to workmen and tooling as required for installation of blind fasteners. The plate 12 has a lower surface 16 which will be assumed to be a blind or inaccessible surface. The plates 10 and 12 are provided with a series of bores 18 extending therethrough arranged for illustrating the sequence of installation of the sleeve portion of the blind fastener, and each of the bores 18 is provided with a countersink 20 to receive the head of the fastener for providing an aerodynamically flush surface 14 of the plate 10. The bores 18 are illustrated as tapered bores, tapering from a relatively large diameter proximate the countersink 20 to a relatively small diameter at the surface 16. However, it is to be understood that the present invention is equally adaptable for use in straight-walled (i.e., cylindrical) bores corresponding to the bores 18.

Figures 1, 2, 3, 4:
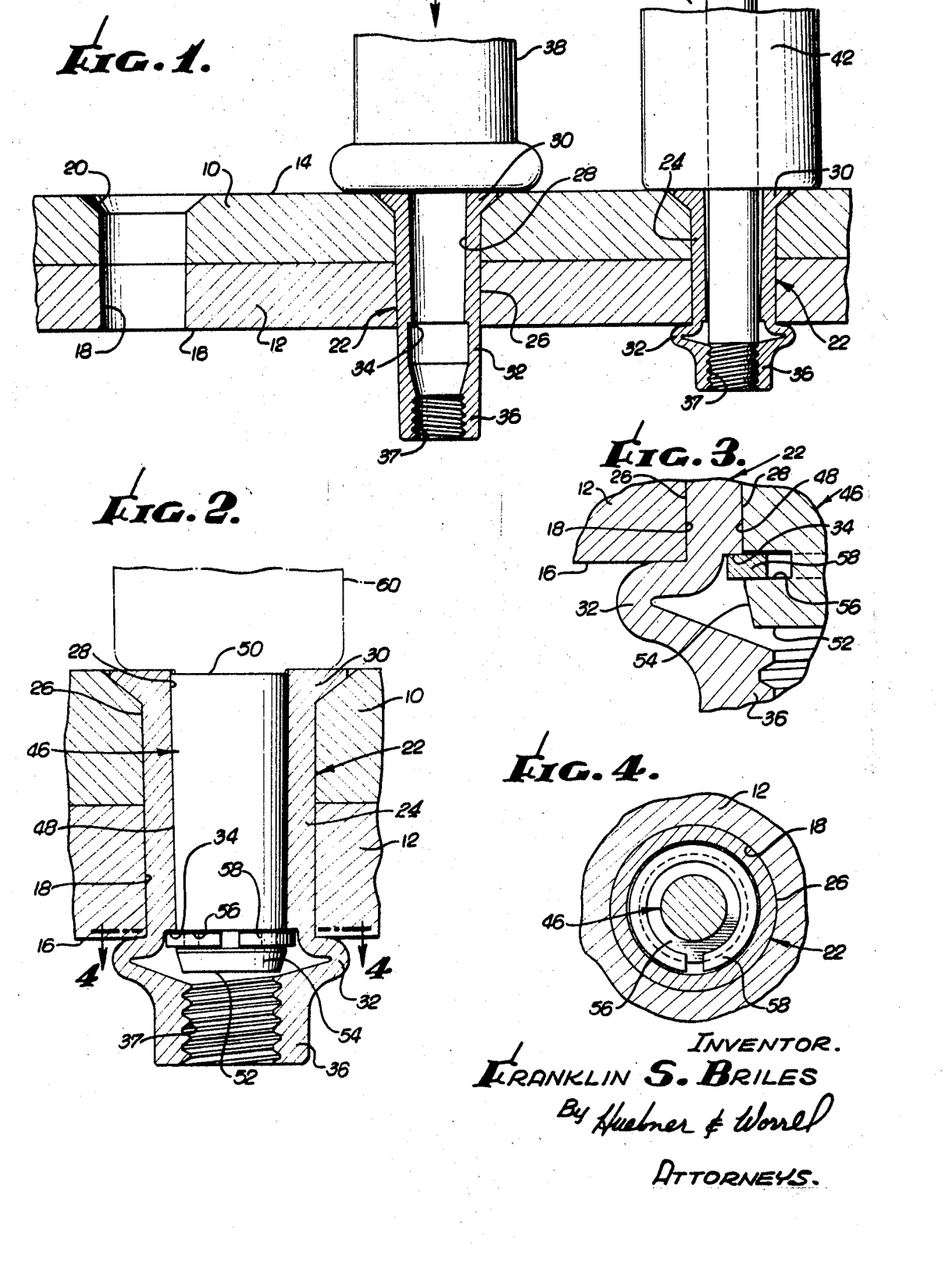
FIGURE 1 is a vertical section, with portions in elevation, showing two sheets or plates which are to be secured together by the present invention and illustrating by stages the manner in which the sleeve portion of a first form of the invention is installed.
FIGURE 2 is an enlarged vertical section, partly in elevation, illustrating installation of the core pin of said first form of the invention within the sleeve of FIGURE 1.
FIGURE 3 is a greatly enlarged, fragmentary vertical section illustrating the retention means for securing the pin within the sleeve in the first form of the invention shown in FIGURES 1 and 2.
FIGURE 4 is a horizontal section taken on the line 4—4 in FIGURE 2.

The sleeve part 22 of the fastener has a tubular body portion 24 generally coextensive in length with the length of the bore 18, and adapted to be seated in the bore 18 as illustrated in FIGURE 1. Body portion 24 of the sleeve 22 has an outer surface 26 generally complementary in size and configuration with the bore 18, and has a tapered inner surface 28 which tapers from a relatively large diameter proximate the outer end of the sleeve to a relatively small diameter approximately the inner end of the body portion 24 of the sleeve. Where the bore 18 is tapered as illustrated in FIGURES 1 and 2, the outer surface 26 of the body portion of the sleeve will likewise be tapered as shown. It is presently preferred to employ substantially the same rate of taper for the bore 18 and outer surface 26 of the body portion of the sleeve on the one hand, and for the inner surface 28 of the body portion of the sleeve on the other hand, and this will provide a substantially uniform wall thickness along the length of the body portion 24 of the sleeve. Utilizing tapered bores 18 has certain advantages, including among others adaptability to high speed, accurate drilling without surface galling within the bore. It will be understood, however, that where straight-walled or cylindrical bores are provided, the outer surface 26 of the body portion 24 of the sleeve will likewise be straight-walled or cylindrical, and the taper of the inner surface 28 of the sleeve will result in a sleeve wall which becomes gradually thicker from the outer end of the sleeve toward the inner end thereof.

A tapered head 30 is provided on the upper or outer end of sleeve 22, and is adapted to seat within countersink 20 so that the surface of head 30 is substantially flush with exposed surface 14 of plate 10.

Below its body portion 24, the sleeve 22 is undercut to provide a thin-walled nut-forming section 32 that terminates at its upper end in a downwardly facing shoulder 34 proximate or slightly above the level of the blind surface 16 of plate 12.

Below the nut-forming section 32 of the sleeve it is thickened by inward tapering of its inner surface to a lowermost pull-up section 36 which is provided with internal threads 37. The thread groove diameter of the threads 37 is less than the smallest diameter of the tapered inner surface 28 of the body portion 24 of the sleeve so that a threaded pull-up tool can be freely inserted through the tapered surface 28 and engaged with the pull-up section 36 as hereinafter described.

The sleeve 22 is inserted into a bore 18 to the position shown in the center of FIGURE 1, wherein the head 30 is seated in the countersink 20, and the nut-forming section 32 and pull-up section 36 protrude beyond the blind surface 16 of the plate 12. Preferably, but not necessarily, the sleeve 22 will fit relatively tightly within the bore 18, and if such is the case the insertion may be accomplished or completed by means of a suitable hammer such as the hammer 38 shown in the center part of FIGURE 1.

After the sleeve 22 has thus been fully inserted in the bore 18, the nut-forming section 32 of the sleeve is buckled outwardly as illustrated in the right-hand side of FIGURE 1 to provide nut means that engages against the blind surface 16 of plate 12. This formation of the nut can be accomplished by a simple preentry pull-up tool such as the tool 40 illustrated in the right-hand side of FIGURE 1. Such a tool 40 includes a tubular holding die 42 which clamps the head 30 of the sleeve down tightly into the countersink 20 while a shaft 44 having a threaded end moves downwardly out of the tubular die 42 through the body portion 24 of the sleeve and is threadedly engaged with the internal threads 37 of the pull-up section 36. The shaft 44 is then moved upwardly so as to buckle the thin-walled nut-forming section 32 of the sleeve radially outwardly to form the nut means on the sleeve, and then the threaded end of the shaft 44 is uncoupled from the threads 37 of the sleeve and the shaft 44 is removed from the sleeve and the entire preentry tool 40 is removed from above the sleeve.

The final step in the assembly of the blind fastener is to drive a tapered core pin 46 downwardly into the sleeve 22 as best illustrated in FIGURE 2. This core pin 46 has a tapered surface 48 which is substantially commensurate in length with the tapered inner surface 28 of the sleeve, and has substantially the same rate of taper as the inner surface 28 of the sleeve. The pin 40 has a flat outer end surface 50 adapted to lie substantially flush with the surface of the sleeve head 30 and the exposed surface 14 of plate 10 when the fastener is fully assembled and in operation. The inner or lower end 52 of the pin has a lead-in bevel 54 adjacent thereto, and when the pin is fully inserted into the sleeve the end 52 remains above the pull-up section 36 of the sleeve so as not to strike the pull-up section of the sleeve and thereby weaken the nut means that has been formed on the sleeve.

Figures 5, 6:
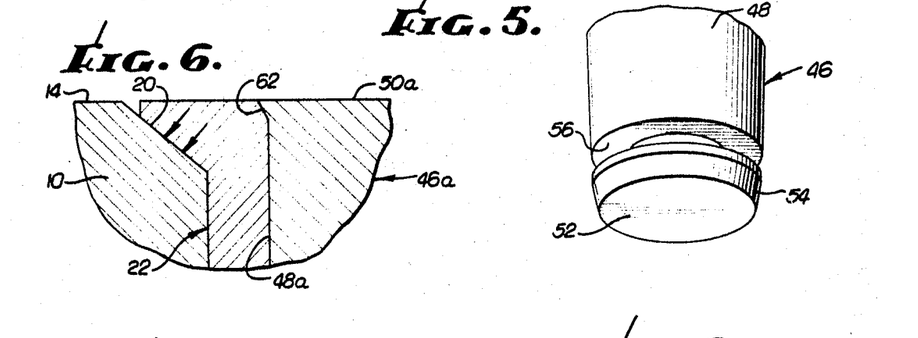
FIGURE 5 is an enlarged, fragmentary perspective view illustrating the lower end portion of the pin in the first form of the invention shown in FIGURES 1 to 4, without the locking ring assembled thereon.
FIGURE 6 is a greatly enlarged, fragmentary vertical section illustrating a first modification of the first form of the invention shown in FIGURES 1 to 5, wherein axial takeup is increased by means of a small annular wedge at the top of the pin.

The pin 46 has an annular groove 56 provided in its lower end portion above the bevel 54 as best shown in FIGURES 2, 3 and 5, and a snap ring 58 is mounted in the groove 56 as best shown in FIGURES 2, 3 and 4. In its position of repose as illustrated in FIGURES 2, 3 and 4, a portion of the snap ring 58 lies within the pin groove 56, while a portion thereof projects radially outwardly from the groove beyond the tapered surface 48 of the pin so as to provide upwardly facing shoulder means adapted to abut against the downwardly facing sleeve shoulder 34 so as to lock the core pin 46 within the sleeve 22.

When the pin 46 is driven into its operative position within the sleeve 22 by a suitable driving tool such as the hammer 60 shown in phantom in FIGURE 2, it is preferably slightly overdriven so as to assure that the snap ring 58 will clear shoulder 34 in the sleeve and thereby snap outwardly below the shoulder 34. There will be a tendency for the pin to be squeezed upwardly because of the tapered, compressive fit in the sleeve, and the dimensions of the parts are preferably related so that such upward movement of the pin in the sleeve will be arrested by engagement of snap ring 58 against shoulder 34 when the outer end surface of the pin is substantially flush with the surface of head 30 and the exposed surface 14 of plate 10. The pin is illustrated as slightly overdriven in FIGURE 2 to ensure proper engagement of the snap ring 58, but shifted back outwardly to its final position in FIGURE 3.

Radial prestressing or preloading both in the fastener and in the region of plates 10 and 12 surrounding the fastener is accomplished by making the core pin 46 oversized to a predetermined extent relative to the inside 28 of the sleeve; i.e., providing the core pin 46 with diameters along the length of its tapered surface 48 which are greater than the corresponding initial diameters of the inner surface 28 along the length of body portion 24 of the sleeve. By this means, when the core pin 46 is driven into the sleeve, it will compress the sleeve radially outwardly against the wall of the bore 18 in plates 10 and 12, thereby establishing the desired extent of preload in the structure.

In order for the core pin 46 to thus compress the sleeve 22 radially outwardly to preload the surrounding structure, the pin 46 will normally be made of a substantially harder material than the sleeve 22. The sleeve 22 is designed for tensile strength, and need not support the high shear stress load for which an aircraft fastener must be designed. High shear stresses can be accommodated by making the core pin 46 as hard as desired, and all that is required of the sleeve 22 to allow utilization of a high shear strength core pin is that the sleeve 22 be harder than the surrounding material of plates 10 and 12. This is no problem in the fastening of aircraft skins which are conventionally made of aluminum.

Preferably, the sleeve 22 will be composed of a metal having a tensile strength of from about 70K s.i. to about 145K s.i., while the core pin 46 will preferably be made of a metal having a tensile strength of about 180K s.i. or above, and typically from about 180K s.i. to about 300K s.i. Thus, the pin 40 will, in all instances, be made of a substantially stronger or harder material than the sleeve 22, and the pin can be made as hard as is desired, according to the shear strength which is desired in the fastener.

Attempts to make conventional bolt-type fasteners very hard, as for example in the neighborhood of 300K s.i., involve serious manufacturing problems because such hard materials cannot be conventionally headed or thread rolled. However, there is no problem in the manufacture of the core pin 46 when it is composed of such a very hard material, because the core pin can be conveniently formed by centerless grinding, as it requires no head and no threads.

It is preferred to make the sleeve 22 of a corrosion resistant metal such as a stainless steel or commercially pure titanium, as this allows tighter manufacturing tolerances for the sleeve wall thickness by eliminating the necessity for plating. The desirability of relatively close tolerance control in the manufacture of the sleeve 22 will be apparent when it is considered that wall thickness variations will result from the variations in both the inner wall 28 and the outer wall 26 of the sleeve.

While it is to be understood that the present invention is not limited to the use of any particular materials, it has been found in practice that it is practical to make the sleeve 22 of such materials as one of 300 series stainless steel alloys such as S.A.E. 302, 304 or 305; of Monel; or of an Austempered steel alloy, as for example 8740 Austempered alloy; or of commercially pure titanium.

If the sleeve is made of a stainless steel alloy, it is preferably to employ a core pin 46 that is made of a hardened steel which, if desired, can be plated. An example of a suitable hardened steel for such use is H–11 5% chrome die steel, which can be heat treated to about 300K s.i. tensile strength for highest shear strength characteristics, or for example a hardened .40 carbon steel such as 8740 or 4340.

If the sleeve is made of commercially pure titanium, it is desirable to make the core pin of a high strength titanium alloy, as for example R.M.I. 1-8-5, which will typicaly have a tensile strength of about 200K s.i., and a relatively high shear strength.

Thus, in summary, it will be seen that it is preferred to make the core pin much harder than the sleeve, high shear strength of the fastener, which is the main requirement in aircraft fasteners, being obtained by a very hard core pin, while the sleeve is sufficiently soft or malleable so as to be expandable by the pin and compressible against the wall of the bore in the structure to provide the desired preload, but at the same time the sleeve is harder than the structure being fastened, and of adequate tensile strength for the desired clamp-up of the parts.

Since the taper of the pin and the inner surface of the sleeve is a relatively mild one, the tendency for the pin to work its way axially outwardly is only relatively slight, and places only a slight load on the locking means which, in the first form of the invention illustrated in FIGURES 1 to 5, in the snap ring 58 and associated shoulders. Accordingly, the snap ring 58 may be composed of any desired resilient metal in accordance with conventional practice.

The rate of taper of the tapered surface 48 of the core pin and of the tapered inner surface 28 of the sleeve is preferably in the range of from about .125 to about .375 inch per foot, with the preferred amount of taper being about .250 inch per foot, including the incline at both sides.

The diameters of the tapered surface 48 of the pin are greater than the corresponding diameters of the inner surface 28 of the sleeve, assuming the outer surface 26 of the sleeve to be fully seated against the tapered bore 18 in the plates 10 and 12, by an amount in the range of from about .006 inch oversize per inch of pin diameter to about .025 inch of oversize per inch of pin diameter. In other words, the amount of interference established between the core pin 46 on the one hand and the combination of sleeve 22 and plates 10 and 12 considered as a solid mass on the other hand, is preferably in the range of from about .006 inch of interference per inch of core pin diameter to about .025 inch of interference per inch of core pin diameter.

It is preferred that when this interference is established it not be so great as to cause the compressive forces of the sleeve against the surrounding material of the structure as represented by plates 10 and 12 to substantially exceed the elastic limit of the structure. In this manner, cracking and stress corrosion in the structure will be avoided. Accordingly, the upper limit for the amount of interference established between the core pin and sleeve may alternatively be defined as that amount of interference which will not cause the radially outwardly directed forces of the sleeve against the surrounding structure to substantially exceed the elastic limit of the structure.

When the core pin is driven into the sleeve to establish the radial interference preload, the preload will be applied not only between the outer sleeve surface 26 and opposing bore surface 18, but will also be between the sleeve head 30 and the wall of the countersink 20. Because of the incline of the countersink, this outwardly directed force of the sleeve head 30 against the wall of the countersink will apply axially upwardly directed forces against the head 30, thereby increasing the axial clamp-up force of the assembled fastener on the structure.

Since the sleeve in the region of head 30 need not be cut away or itself countersunk to accommodate any head of the core member, the sleeve head 30 will have adequate strength for the clamp-up without requiring that it be oversized; i.e., the head 30 may be of substantially the same size as a conventional countersunk bolt head. This minimizes the amount of the structural material which must be cut away to provide the countersink 20, thereby allowing maximum strength of the structure.

The radial prestressing of the sleeve against the structural member adjacent the expanded nut portion 32 of the sleeve solidly locks the sleeve against the structure at that point, thereby preventing any substantial working or movement of the fastener in the bore at the lower or inner end of the bore. This is a further advantage of the present invention over conventional prior art blind fasteners wherein some clearance was usually present between the fastener and the wall of the bore proximate the blind end of the bore, resulting in working movement and consequent fatigue in the joint.

Referring now to FIGURE 6 of the drawings, the blind fastener which is there illustrated is identical to the fastener illustrated in FIGURES 1 to 5, except for a slightly modified core pin 46a which has a small annular wedge 62 immediately adjacent the upper or outer end surface 50a thereof. The annular wedge 62 flares upwardly and outwardly from the tapered outer surface 48a of the core pin 46a, the tapered surface 48a otherwise being the same as the tapered surface 48 on the core pin 46 that is shown in FIGURES 2 through 5. This use of the wedge-top pin 46a further increases the force of the sleeve head against the countersink wall 20 as indicated by the arrows in FIGURE 6, thereby further improving the axial clamp-up of the assembled fastener on the structure.

Figure 7:
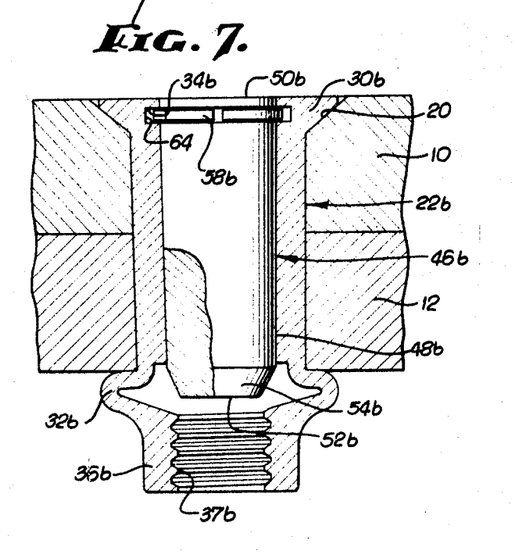
FIGURE 7 is an enlarged vertical section, partly in elevation, generally similar to FIGURE 2, but illustrating a second variation of said first form of the invention shown in FIGURES 1 to 5, wherein the locking ring engaged between the pin and sleeve for securing the pin axially within the sleeve is disposed adjacent the top or outer end of the fastener instead of adjacent the bottom or inner end of the fastener.
Figure 8:
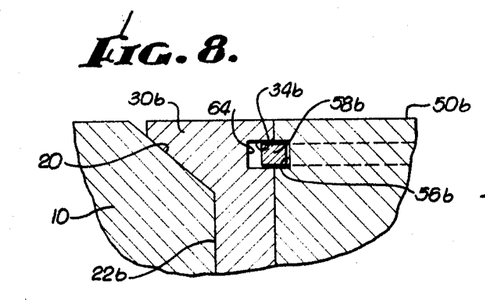
FIGURE 8 is a greatly enlarged vertical section showing a portion of the structure illustrated in FIGURE 7 in more detail.
Figure 9:
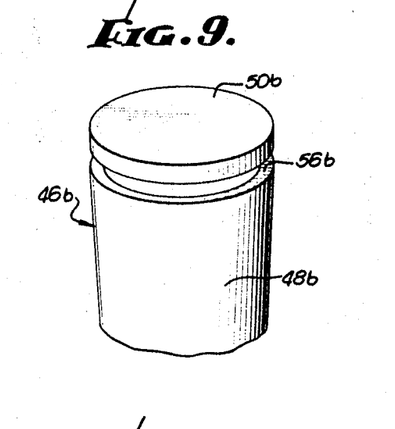
FIGURE 9 is a perspective view illustrating the outer or upper end portion of the pin member of FIGURES 7 and 8.

FIGURES 7 to 9 illustrate another variation of the first form of the invention illustrated in FIGURES 1 to 5, wherein the snap ring for securing the pin within the sleeve is relocated from a position near the lower end of the fastener to a position near the upper end of the fastener. Thus, the sleeve 22b is identical to the sleeve 22, except for annular groove 64 within the sleeve in the region of the head 30b of the sleeve. Snap ring 58b is preassembled in the sleeve 22b before insertion of pin 46b in the sleeve. Bevel 54b adjacent the lower or inner end 52b of the pin permits easy entry of the pin through the constriction provided by the snap ring 58b in the sleeve, and the long taper of the pin 46b gradually cams snap ring 58b outwardly until groove 56b in the pin registers with the snap ring, at which time the snap ring 58b will engage in groove 56b of the pin so as to lock the pin in place. The groove 56b is offset a short distance downwardly from the upper end surface 50b of the pin and the upper surface of the sleeve head 30b. In all other respects, the blind fastener of FIGURES 7 to 9 is the same as the fastener of FIGURES 1 to 5. Thus, the lower end portion of the sleeve 22b is provided with a thin-walled nut-forming section 32b and with a pull-up section 36b having internal threads 37b.

Figure 10:
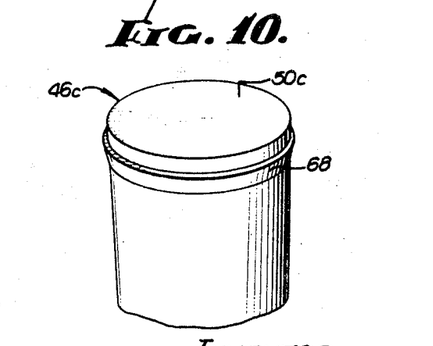
FIGURE 10 is a perspective view similar to FIGURE 9 but illustrating the outer or upper portion of the pin portion of a second form of the invention wherein the pin is provided with a single annular serration or tooth a short distance inwardly or downwardly from the top of the pin as the means for retaining the pin member within the sleeve member.
Figure 11:
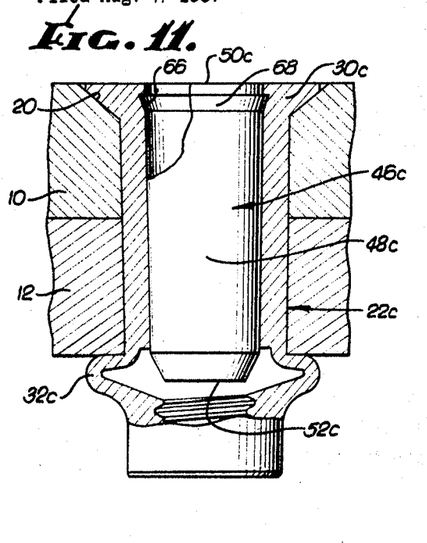
FIGURE 11 is an enlarged vertical section generally similar to FIGURES 2 and 7, but illustrating in assembled form said second form of the invention embodying the pin member illustrated in FIGURE 10.
Figure 12:
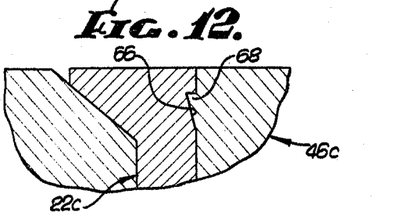
FIGURE 12 is a greatly enlarged, fragmentary vertical section illustrating in particular the locking means of the second form of the invention shown in FIGURES 10 and 11.

FIGURES 10 to 12 illustrate a second form of the invention wherein the interlock between the pin and sleeve is accomplished by means of engagement of an annular serration or tooth 68 on the pin 46c in a complementary annular notch 66 in the head 30c of the sleeve 22c. With the exception of the annular notch 66 in the sleeve, the sleeve 22c is otherwise the same as the sleeve 22 of FIGURES 1 to 5. The annular tooth or serration 68 on the pin flares upwardly and outwardly from the tapered surface along the length of the pin, and terminates at an abrupt upwardly facing shoulder that is spaced a short distance downwardly or inwardly from the upper end surface 50c of the pin. By thus disposing the engaging tooth or serration 68 of the pin and notch 66 of the sleeve close to the upper end of the fastener, any disturbance of the metal of the sleeve by the tooth or serration 68 on the pin as the pin is driven into the fully engaged position will not appreciably diminish the overall preload accomplished by engagement of the tapered outer surface of the pin against the tapered inner surface of the sleeve. Entry of the annular tooth or serration 68 of the pin through the upper end of the sleeve into the notch 66 in the sleeve is allowed by resiliency of the material in the sleeve.

Figure 13:
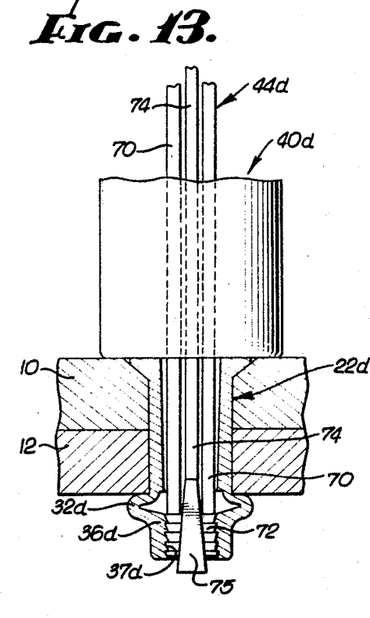
FIGURES 13 is a vertical section, partly in elevation, illustrating installation of the sleeve portion of a third form of the invention utilizing serrated locking means engageable between the pin and sleeve.

FIGURES 13 to 16 disclose a third form of the invention wherein the interlock between the pin and sleeve is accomplished by serrated engagement means adjacent the lower or inner ends of the pin and sleeve beyond the blind surface of the structure. In this form of the invention the sleeve 22d is identical to the sleeve 22 of FIGURES 1 to 5 with the exception that the pull-up section 36d has internal annular serrations 37d instead of the internal threads 37 of sleeve 22. This use of serrations 37d in the pull-up section 36d requires a different pull-up tool than the pull-up tool 40 illustrated in FIGURE 1. A satisfactory pull-up tool 40d is illustrated in FIGURE 13, and includes a pull-up shaft 44d having a split outer portion 70 with external serrations 72 on its free end. An expander rod 74 extends through the outer portion 70 of shaft 44d and terminates in a wedge 75. Normally the free end of outer portion 70 of the tool is resiliently constricted so as to be small enough for entry into and removal from the confines of the pull-up section 36d. Thus, in operation, the tool shaft 44d is inserted through the sleeve 22d until the serrations 72 on the outer portion 70 of the pull-up tool register with the internal serrations 37d in the pull-up section 36d of the sleeve, and then the rod 74 is moved upwardly relative to the outer part 70 of the shaft so as to cam the serrated end part of the shaft outwardly into engagement with the internal serrations 37d, at which time the entire pull-up tool shaft 44d is moved upwardly so as to buckle the nut-forming section 32 of the sleeve into the outwardly flaring nut as disclosed in FIGURE 13. Then, the rod 74 is moved downwardly to allow the serrated end of the split shaft 70 to contract so that the entire pull-up tool shaft 44d can be removed from the sleeve.

Figure 14:
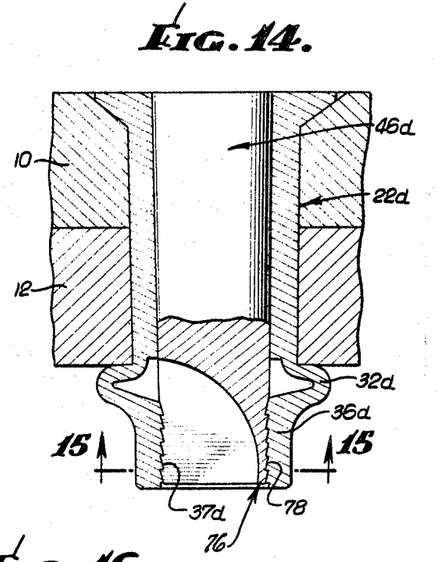
FIGURE 14 is an enlarged vertical section, partly in elevation, showing the fully assembled fastener which embodies the sleeve of FIGURE 13.
Figures 15, 16:
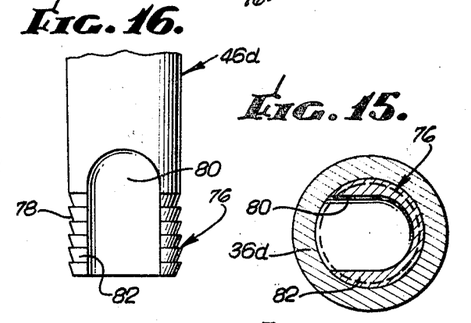
FIGURE 15 is a horizontal section taken on the line 15—15 in FIGURE 14.
FIGURE 16 is an enlarged, fragmentary view of the inner or lower end portion of the pin part of the fastener shown in FIGURES 13 to 15, viewing the pin from the left-hand side thereof as viewed in FIGURE 14.

The pin 46d as illustrated in FIGURE 14, 15 and 16 has a solid tapered body that is generally coextensive with the tapered passage through the sleeve, and terminates at its lower end in a serrated locking extension 76 which is resiliently contractable to allow entry thereof in the internally serrated pull-up section 36d of the sleeve without applying enough downward axial force on the bottom part of the sleeve to harm the formed nut section 32d. In this manner, external serrations 78 on the lower or inner end part of the pin 46d snap into engagement with the complementary internal serrations 37d in the sleeve so as to lock the pin in the sleeve.

The resilient contractability of the lower or inner end portion of the pin 46d is provided by cutting away a groove 80 in the lower end portion of the pin so that the locking extension 76 on the pin is a relatively thin-walled, resilient, U-shaped structure capable of providing sufficient radial constriction to allow the pin serrations 78 to move downwardly into engagement with the sleeve serrations 37d. This construction of the locking extension 76 on the pin is simple to achieve despite the use of a hard material for the pin because the groove 80 can be cut into the pin by a simple cutting or grinding wheel.

Figure 17:
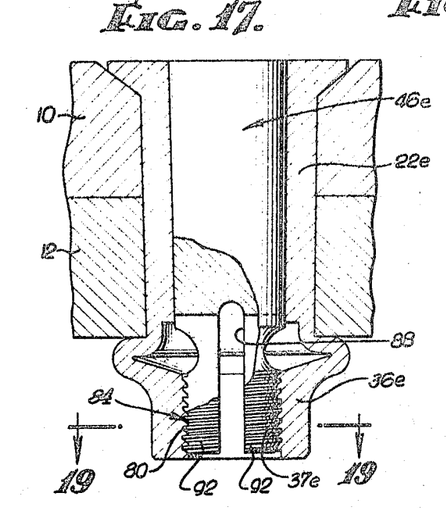
FIGURE 17 is an enlarged vertical section, partly in elevation, showing a fourth form of the invention with the core pin and sleeve assembled, embodying buttress thread means engageable between the pin and sleeve.
Figure 18:
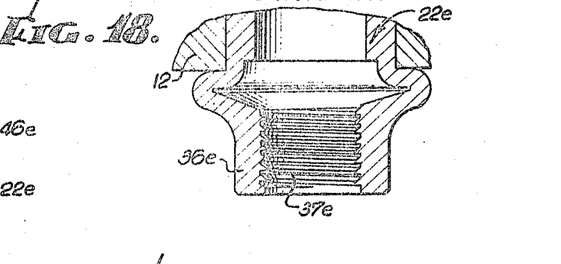
FIGURE 18 is an enlarged, fragmentary vertical section illustrating the inner or lower end portion of the sleeve in the fourth form of the invention shown in FIGURE 17, prior to engagement of the pin member in the sleeve.
Figure 19:
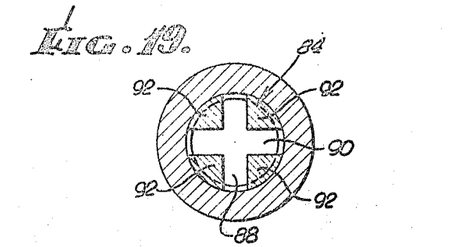
FIGURE 19 is a horizontal section taken on the line 19—19 in FIGURE 17.

Another type of resilient locking extension 84 is disclosed in the fourth form of the invention illustrated in FIGURES 17, 18 and 19 of the drawings. In this fourth form of the invention, the sleeve 22e is provided with a pull-up section 36e having internal threads 37e of a buttress or sawtooth configuration, and the core pin 46e has complementary buttress threads 86 on its locking extension 84.

Resiliency of the locking extension 84 on the pin is provided by cutting or grinding a pair of axially extending grooves 88 and 90 in the lower end portion of 46e, the grooves 88 and 90 being disposed generally at right angles with respect to each other as is best shown in FIGURE 19. This leaves four spring tines 92 which have sufficient resiliency to permit the pin 46e to be driven straight down into its operative position in the sleeve 22e without any rotation, the tines 92 deflecting inwardly to allow the pin threads 86 to pass over and then interlock with the sleeve threads 37e as shown in FIGURE 17. Despite the employment of interlocking threads between the pin and sleeve in the form of the invention shown in FIGURES 17 to 19, the straight-driving, snap-in insertion of the pin into the sleeve is utilized instead of a threading, rotational engagement (which would require some wrenching means in the top of the pin), because the tight interference fit of the pin in the sleeve makes such rotational engagement too difficult to be practical.

It will be apparent that the buttress thread engagement means of the form of the invention shown in FIGURES 17 to 19 is in effect another form of serrated engagement means which permits engagement of the pin in the sleeve in substantially the same manner as engagement of the pin in the sleeve in the form of the invention shown in FIGURES 13 to 15. Also, it is to be noted that if desired the locking extension 84 on the pin employed in the form of FIGURES 17 to 19 can be provided its resiliency by the use of a single cutaway groove like the groove 80 in the form shown in FIGURES 13 to 16; and alternatively the locking pin of FIGURES 13 to 16 could have its resiliency provided by means of crossed grooves similar to the grooves 88 and 90 shown in FIGURES 17 and 19.

Since the pull-up section 36d of FIGURES 17 to 19 has serration-type threads 37e therein, the nut can be formed on the sleeve 22e either by a threaded preentry tool similar to the tool shown in FIGURE 1 but with buttress threads thereon, or by an expansion pull-up tool similar to that shown in FIGURE 13, but with serration means thereon complemetary to the buttress threads 37e.

Figure 20:
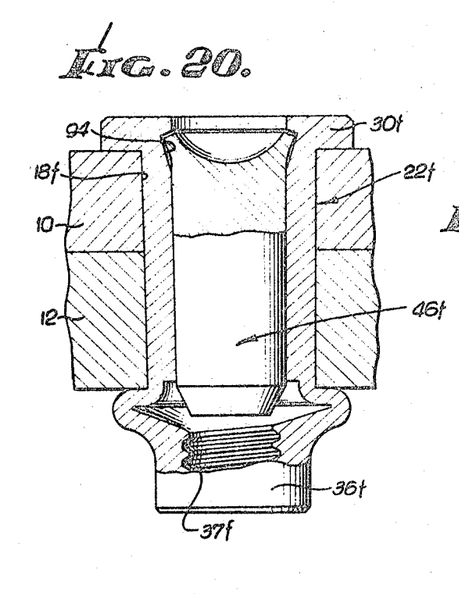
FIGURE 20 is an enlarged vertical section, partly in elevation, illustrating a fifth form of the invention in assembled form, wherein the pin member has spreadable lip means proximate its upper end engaged in complementary notch means in the sleeve for retention of the pin in the sleeve.
Figure 21:
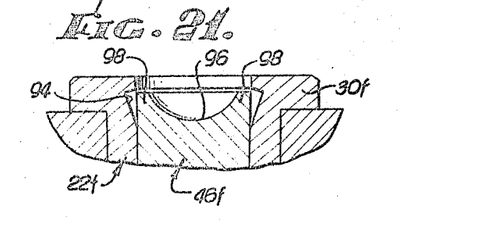
FIGURE 21 is a fragmentary vertical section showing the upper part of the combination of FIGURE 20 before the lip means on the pin has been spread into the locking position.
Figure 22:
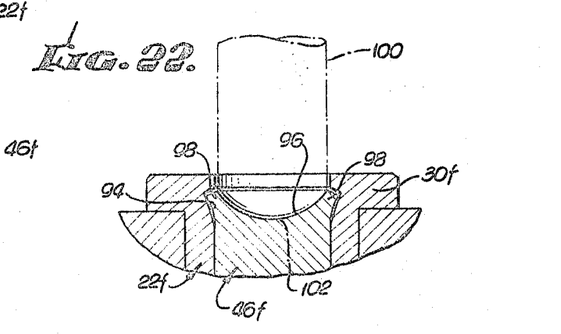
FIGURE 22 is a vertical section similar to FIGURE 21, illustrating the spreading of the lip means on the pin into the locking position.

FIGURES 20 to 22 illustrate a fifth form of the invention wherein the sleeve 22f is provided with notch means 94 in the head portion 30f thereof, to receive radially expandable lip means 98 formed at the upper end of the pin 46f by provision of a recess 96 in the upper end of the pin. Since the head of the blind fastener shown in FIGURES 20 to 22 has a substantial recess therein, when the fastener is assembled, this fastener will not normally be employed in a situation where a flush head is utilized. Accordingly, this fastener has been shown in the form of a buttonhead fastener, wherein the head portion 30f on the sleeve is a button type head that protrudes upwardly above the outer plate 10 in overlapping relationship thereto.

In the form of the invention shown in FIGURES 20 to 22 the lip means 98 may be either a continuous annular lip, or a segmented lip (not shown), and the lip means 98 is preferably somewhat softer than the main body of the pin so as to permit the outward forming of the lip means 98 by a suitable spreader tool such as the tool 100 having a rounded end 102 as shown in phantom in FIGURE 22.

With the buttonhead type of fastener, the bore 18f through the structure to be fastened will extend all of the way between the outer and blind surfaces of the structure, since a countersink is not required. The lower end portion of the sleeve 22f may be similar to the lower end portion of the sleeve 22 shown in FIGURES 1 to 4, including a pull-up section 36f having standard internal threads 37f.

Shouldered engagement between the sleeve and core pin can be alternatively accomplished or assisted in some forms of the present invention by a forming step applied to the head of the sleeve after the core pin has been driven into full engagement in the sleeve. When the pin is fully inserted in the sleeve, the sleeve is so tightly wedged in its seated position in the bore that a substantial forming impact or compression can be applied downwardly against the head or a portion thereof to cause radial inward flow of head material to grip shoulder means on the pin to provide this type of shouldered engagement between the sleeve and pin. If desired, an initial raised portion may be provided on the head so that after such movement of the head material the final outer surface of the head will be substantially flush with the outer surface of the structure being fastened.

One example of this type of shouldered engagement is in connection with the form of the invention illustrated in FIGURES 10 to 12 of the drawings. In the event the short upper end section of the sleeve passage is pushed outwardly a substantial amount by passage of the tooth or serration 68 therethrough, the head 30c can be compressed downwardly adjacent the pin so as to move the head material back over the serration 68 and against the upper end of the pin thereabove for full shouldered engagement between the sleeve and pin.

In this same form of the invention of FIGURES 10 to 12, if it is desired the notch 66 in the sleeve may extend all the way up to the surface of the head so that the serration 68 does not have to force the head material radially outwardly during entry. Then the head 30c can be impacted or compressed downwardly to flow material of the head radially inwardly against the upper end of the pin above the serration 68.

If desired, the serration 68 can be omitted and the upper end of pin 46c stepped radially inwardly to provide an annular notch proximate the upper end 50c of the pin into which material of the head 30c may be moved.

Another example of this type of shouldered engagement between the sleeve and pin is in connection with the form of the invention shown in FIGURES 7 to 9, wherein the annular groove 64 may be omitted from the sleeve, and also the snap ring 58b omitted, and the head 30b may be impacted or compressed downwardly so that head material will flow into the pin groove 56b to secure the pin axially in the sleeve.

A further example of the application of this type of shouldered engagement to the present invention is in connection with the form of the invention shown in FIGURES 20 to 22. Here, the pin 46f need not have the lip means 98 at its upper end, and the head 30f need not have the notch means 94. The shouldered engagement may be embodied instead by flowing head material over the periphery of pin 46f at its upper end.

While the instant invention has been shown and described herein in what are conceived to be the most practical and preferred embodiments, it is recognized that departures may be made therefrom within the scope of the invention.

I claim:

1. A blind fastener to secure structure having an exposed outer surface and a blind inner surface with a bore extending therethrough between said surfaces, said fastener comprising a sleeve member engageable in the bore from said outer surface and having a head at its outer end adapted to seat against the structure proximate said outer surface, a body portion generally coextensive with the bore and having a tapered passage therein decreasing in diameter toward the inner end, and a nut forming portion extending from said body portion inwardly beyond said inner surface and adapted to be buckled radially outwardly against said inner surface by a preentry pull-up tool insertable through said sleeve passage, a core pin member linearly telescopically drivable into said sleeve passage and having a tapered surface generally coextensive with and tapered in the same direction as said tapered sleeve passage but diametrically oversized relative to said sleeve passage so as to preload the sleeve radially outwardly against the surrounding structure, and means engageable between the pin and sleeve to secure the pin against outward axial movement with respect to the sleeve.

2. A blind fastener as defined in claim 1, wherein the rate of taper of said sleeve passage and of said tapered surface of the core pin is in the range of from about .125 inch per foot to about .375 inch per foot.

3. A blind fastener as defined in claim 1, wherein said tapered surface of the pin is diametrically oversized with respect to said sleeve passage a sufficient amount to cause substantial radial prestressing in the material of the structure immediately surrounding the fastener, but insufficient radial prestressing to substantially exceed the elastic limit of said material of the structure.

4. A blind fastener as defined in claim 3, wherein the diameters of said tapered surface of the core pin are greater than the initial corresponding diameters of said tapered sleeve passage prior to driving of the pin into the sleeve by at least about .006 inch per inch of pin diameter.

5. A blind fastener as defined in claim 1, wherein the diameters of said tapered surface of the core pin are greater than the initial corresponding diameters of said tapered sleeve passage prior to driving of the pin into the sleeve by from about .006 inch per inch of pin diameter to about .025 inch per inch of pin diameter.

6. A blind fastener as defined in claim 1, wherein the wall of the bore and the outer surface of said body portion of the sleeve are both tapered in the same direction and with substantially the same rate of taper as said tapered sleeve passage, said body portion of the sleeve having a substantially uniform wall thickness along its length.

7. A blind fastener as defined in claim 1, wherein said outer surface of the structure has a countersink therein at the outer end of the bore and said head on the sleeve is a tapered head which seats in said countersink, said tapered sleeve passage and oversized tapered pin surface extending axially into the region of said head so as to preload the taper of the head against said countersink.

8. A blind fastener as defined in claim 7, wherein the core pin has an upwardly and outwardly flaring annular wedge at the top thereof so as to produce increased preloading of the head taper against said countersink and thereby increase the axial clamp-up force of the fastener against the structure.

9. A blind fastener as defined in claim 1, wherein the core pin is composed of substantially harder material than said sleeve.

10. A blind fastener as defined in claim 9, wherein said sleeve is composed of a metal having a tensile strength in the range of from about 70K s.i. to about 145K s.i.

11. A blind fastener as defined in claim 9, wherein said core pin is composed of a metal having a tensile strength of at least about 180K s.i.

12. A blind fastener as defined in claim 9, wherein said sleeve is composed of a metal having a tensile strength in the range of from about 70K s.i. to about 145K s.i., and said core pin is composed of a metal having a tensile strength of at least about 180K s.i.

13. A blind fastener as defined in claim 1, wherein said securing means comprises a snap ring supported in a groove in one of said sleeve and pin members and engageable against a shoulder on the other of said members.

14. A blind fastener as defined in claim 13, wherein said shoulder is an inwardly facing shoulder on the inner end of said body portion of the sleeve adjacent to said nut forming portion of the sleeve, and said snap ring is supported inwardly of said shoulder in a groove in said pin member.

15. A blind fastener as defined in claim 1, wherein said securing means comprises a small annular tooth on said pin engageable in a complementary annular notch in the head portion of the sleeve, said tooth having an inclined ramp surface thereon facilitating entry thereof through the outer end portion of the sleeve passage and into said notch.

16. A blind fastener as defined in claim 1, wherein said securing means comprises a radially inwardly formed portion of the sleeve head in overlapping relationship with upwardly facing shoulder means on the pin.

17. A blind fastener to secure structure having an exposed outer surface and a blind inner surface with a bore extending therethrough between said surfaces, said fastener comprising a sleeve member engageable in the bore from said outer surface and having a head at its outer end adapted to seat against the structure proximate said outer surface, a body portion generally coextensive with the bore and having a tapered passage therein decreasing in diameter toward the inner end, and a nut forming portion extending from said body portion inwardly beyond said inner surface and adapted to be buckled radially outwardly against said inner surface by a pre-entry pull-up tool insertable through said sleeve passage, a core pin member telescopically drivable into said sleeve passage and having a tapered surface generally coextensive with and tapered in the same direction as said tapered sleeve passage but diametrically oversized relative to said sleeve passage so as to preload the sleeve radially outwardly against the surrounding structure, and means engageable between the pin and sleeve to secure the pin against outward axial movement with respect to the sleeve, said securing means comprising notch means in the head portion of the sleeve and permanently deformable lip means on the outer end of the pin, said lips means being radially outwardly deformed into engagement in said notch means when the pin is fully engaged in the sleeve by insertion of a spreader tool into the outer end of said sleeve passage.

18. A blind fastener to secure structure having an exposed outer surface and a blind inner surface with a bore extending therethrough between said surfaces, said fastener comprising a sleeve member engageable in the bore from said outer surface and having a head at its outer end adapted to seat against the structure proximate said outer surface, a body portion generally coextensive with the bore and having a tapered passage therein decreasing in diameter toward the inner end, a nut forming portion extending from said body portion inwardly beyond said inner surface and a pull-up portion at the innermost end of the sleeve, said nut forming portion being a section of the sleeve having a thinner wall than the adjacent body and pull-up portions which is adapted to be buckled radially outwardly against said inner surface of the structure by a preentry pull-up tool insertable through said sleeve passage and releasably engageable with said pull-up portion of the sleeve, a core pin member linearly telescopically drivable into said sleeve passage and having a tapered surface generally coextensive with and tapered in the same direction as said tapered sleeve passage but diametrically oversized relative to said sleeve passage so as to preload the sleeve radially outwardly against the surrounding structure, and shoulder means engageable between the pin and sleeve to secure the pin against outward axial movement with respect to the sleeve.

19. A blind fastener as defined in claim 18, wherein said pull-up portion of the sleeve has internal threads therein for releasable engagement of a preentry pull-up tool therewith.

20. A blind fastener to secure structure having an exposed outer surface and a blind inner surface with a bore extending therethrough between said surfaces, said fastener comprising a sleeve member engageable in the bore from said outer surface and having a head at its outer end adapted to seat against the structure proximate said outer surface, a body portion generally coextensive with the bore and having a tapered passage therein decreasing in diameter toward the inner end, a nut forming portion extending from said body portion inwardly beyond said inner surface and a pull-up portion at the innermost end of the sleeve, said nut forming portion being a section of the sleeve having a thinner wall than the adjacent body and pull-up portions which is adapted to be buckled radially outwardly against said inner surface of the structure by a preentry pull-up tool insertable through said sleeve passage and releasably engageable with said pull-up portion of the sleeve, a core pin member telescopically drivable into said sleeve passage and having a tapered surface generally coextensive with and tapered in the same direction as said tapered sleeve passage but diametrically oversized relative to said sleeve passage so as to preload the sleeve radially outwardly against the surrounding structure, and shoulder means engageable between the pin and sleeve to secure the pin against outward axial movement with respect to the sleeve, said pull-up portion of the sleeve having internal threads therein for releasable engagement of a preentry pull-up tool therewith, said threads being buttress-type threads having the abrupt sides thereof facing inwardly to provide a portion of said shoulder means, and the core pin being provided with a locking extension on its inner end which extends into said pull-up portion of the sleeve, said locking extension having buttress threads thereon providing another portion of said shoulder means which are complementary to and engageable with said threads in the pull-up portion of the sleeeve, said locking extension being resiliently radially inwardly deflectable to permit said pin threads to move into registry with said sleeve threads when the pin is driven into the sleeve.

21. A blind fastener to secure structure having an exposed outer surface and a blind inner surface with a bore extending therethrough between said surfaces, said fastener comprising a sleeve member engageable in the bore from said outer surface and having a head at its outer end adapted to seat against the structure proximate said outer surface, a body portion generally coextensive with the bore and having a tapered passage therein decreasing in diameter toward the inner end, a nut forming portion extending from said body portion inwardly beyond said inner surface and a pull-up portion at the innermost end of the sleeve, said nut forming portion being a section of the sleeve having a thinner wall than the adjacent body and pull-up portions which is adapted to be buckled radially outwardly against said inner surface of the structure by a preentry pull-up tool insertable through said sleeve passage and releasably engageable with said pull-up portion of the sleeve, a core pin member telescopically drivable into said sleeve passage and having a tapered surface generally coextensive with and tapered in the same direction as said tapered sleeve passage but diametrically oversized relative to said sleeve passage so as to preload the sleeve radially outwardly against the surrounding structure, and shoulder means engageable between the pin and sleeve to secure the pin against outward axial movement with respect to the sleeve, said pull-up portion of the sleeve having internal annular serrations therein which have abrupt sides thereof facing inwardly to provide a portion of said shoulder means, and the core pin being provided with a locking extension on its inner end which extends into said pull-up portion of the sleeve, said locking extension having serrations thereon providing another portion of said shoulder means which are complementary to and engageable with said serrations in the pull-up portion of the sleeve, said locking extension being resiliently radially inwardly deflectable to permit said pin serrations to move into registry with said sleeve serrations when the pin is driven into the sleeve.

(References on following page)

References Cited

UNITED STATES PATENTS

| | | | |
|---|---|---|---|
| 2,392,133 | 1/1946 | Eklund | 85—70 |
| 2,435,144 | 1/1948 | Kubicki | 85—70 |
| 2,562,019 | 7/1951 | Colley | 85—70 |
| 2,751,809 | 6/1956 | Barker | 85—82 |
| 3,044,340 | 7/1962 | Luhm | 85—83 |
| 3,034,611 | 5/1962 | Zenzic. | |
| 3,221,794 | 12/1965 | Acres | 85—8.8 |
| 3,271,058 | 9/1966 | Anderson. | |

EDWARD C. ALLEN, Primary Examiner

U.S. Cl. X.R.

287—189.36